(12) United States Patent
Takahashi

(10) Patent No.: US 6,260,353 B1
(45) Date of Patent: Jul. 17, 2001

(54) NOX REDUCTION SYSTEM FOR COMBUSTION EXHAUST GAS

(75) Inventor: Yoshinori Takahashi, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/349,917

(22) Filed: Jul. 8, 1999

(30) Foreign Application Priority Data

Jul. 10, 1998 (JP) .................................................. 10-229922

(51) Int. Cl.$^7$ ...................................................... F01N 3/00
(52) U.S. Cl. ................................. 60/286; 60/289; 60/303
(58) Field of Search .............................. 60/303, 299, 300, 60/286, 289

(56) References Cited

U.S. PATENT DOCUMENTS

| 3,779,015 | * | 12/1973 | Marouka | 60/286 |
| 4,359,863 | * | 11/1982 | Virk et al. | 60/303 |
| 5,419,121 | * | 5/1995 | Sung et al. | 60/303 |
| 5,606,856 | * | 3/1997 | Linder et al. | 60/286 |
| 5,758,493 | * | 6/1998 | Asik et al. | 60/274 |
| 5,974,789 | * | 11/1999 | Mathes et al. | 60/286 |

FOREIGN PATENT DOCUMENTS

| 454926U | 5/1992 | (JP) . |
| 6212952A | 8/1994 | (JP) . |

* cited by examiner

*Primary Examiner*—Jeanette Chapman
*Assistant Examiner*—Sneh Varma

(57) ABSTRACT

A NOx reduction system includes a NOx catalytic converter mounted in an exhaust passage of an engine, such as a diesel engine, and an air supply passage that communicates with a portion of the exhaust passage located upstream of the NOx catalytic converter. The air supply passage supplies the exhaust passage with a mixture of air and cracked gas obtained by spraying fuel into the air and heating it up to 350–450° C. for partial oxidation thereof. With the mixture added to the exhaust gas, NOx contained in the exhaust gas can be effectively removed due to the NOx reducing capability of the cracked gas.

15 Claims, 4 Drawing Sheets

NOX REDUCTION SYSTEM FOR COMBUSTION EXHAUST GAS

FIELD OF THE INVENTION

The present invention relates to a NOx reduction system for combustion exhaust gases, which is able to effectively reduce or remove NOx contained in combustion exhaust gases of, for example, diesel engines.

BACKGROUND OF THE INVENTION

As a conventional method for reducing NOx contained in combustion exhaust gases of, for example, diesel engines, it had been considered effective to add a reducing agent to exhaust gas, and bring the resulting exhaust gas into contact with a NOx catalyst, such as a metallosilicate system having a molecular sieve structure, as disclosed in Japanese laid-open Utility Model Publication No. 4-54926.

It is most convenient to use diesel fuel or light oil of the diesel engine, as the reducing agent, for improving NOx reducing capability of NOx catalyst. In a known NOx reduction system as schematically shown in FIG. 3, a NOx converter 03 is mounted in an exhaust passage 01 of a diesel engine, with a NOx catalyst 02 accommodated in the converter 03, and a fuel injection device 04 is provided at a certain position of the exhaust passage located upstream of the NOx converter 03, so that diesel fuel can be directly injected into the exhaust passage to be added to the exhaust gas. With this known method, however, sufficiently high NOx reduction efficiency cannot be obtained, as shown in the graph of FIG. 4 (curve B).

In the graph of FIG. 4, the vertical axis represents the NOx reduction efficiency (%), and the horizontal axis represents the temperature of a test gas having substantially the same composition as the exhaust gas of an actual diesel engine. Thus, FIG. 4 shows the results of a test of measuring NOx reduction capability, in which test he flow rate of the test gas (SV) was equal to 4000 $h^{-1}$, and diesel fuel or light oil was added to the test gas at a concentration of 3000 PPM.

The exhaust gas temperature of diesel engines for trucks is generally in the range of 100 to 200° C. during idling operations, and about 500° C. during full-throttle operations. From the standpoint of the relationship between the operation state of the engine and the NOx concentration in the exhaust gas, it is highly desirable or ideal to provide a NOx reducing characteristic as indicated by line A of FIG. 4 consisting of three segments that form the upper part of a trapezoid. The above-described method, in which diesel fuel is directly injected into the exhaust gas, however, provides a NOx reduction characteristic as indicated by curve B in FIG. 4, in which the values of the NOx reduction efficiency are far lower than those of the target performance line A. More specifically, the NOx reduction efficiency in a narrow range of the exhaust gas temperature around 400° C. is only slightly higher than 30%, which is unsatisfactory for practical use. It is to be noted that the range of the test gas temperature that is higher than 500° C. corresponds to an overload operating state that rarely occurs during operations of the engine.

In an exhaust gas purifying system as disclosed in Japanese laid-open Utility Model Publication No. 4-54926, diesel fuel is thermally decomposed and added to exhaust gas, which is then supplied to a NOx catalytic converter to improve the NOx reduction efficiency. FIG. 5 schematically shows the construction of the system as disclosed in the above-identified Utility Model Publication No. 4-54926. The system of FIG. 5 includes a four-cycle diesel engine 05 for a motor vehicle, an in-line fuel injector pump 06 that supplies fuel to a fuel injection nozzle 07 provided for each cylinder of the engine 05 through a corresponding fuel supply pipe 08, a feed pump 09 that supplies fuel in a fuel tank to the fuel injector pump 06 through a fuel supply pipe 010, an exhaust passage 011 including an exhaust manifold 012 of the diesel engine 05, and a NOx catalytic converter 013 disposed in the exhaust passage 011. A NOx catalyst 014 containing metallosilicate is accommodated in the catalytic converter 013.

A thermal decomposition device 015 is connected to a portion of the exhaust passage 011 located upstream of the NOx catalytic converter 013. The thermal decomposition device 015 includes a decomposition chamber 017 surrounded by an electric heater 016, a fuel injection valve 018 that injects diesel fuel into the decomposition chamber 017, and an exhaust gas supply passage 020 that supplies exhaust gas in the exhaust passage 011 to the decomposition chamber 017 through a flow rate control valve 019. A fuel supply branch pipe 021 is also provided through which the diesel fuel is supplied from the fuel supply pipe 010 to the fuel injection valve 018.

In the system as disclosed in the above-indicated Japanese Utility Model Publication No. 4-54926, exhaust gas supplied from the exhaust supply passage 020 to the decomposition chamber 017 is heated to a high temperature in the vicinity of 1000° C. by the electric heater 016, and the diesel fuel injected from the fuel injection valve 018 is thermally decomposed under the high-temperature atmosphere, to provide unsaturated lower hydrocarbon for use in NOx reduction. Owing to the presence of this reducing HC, the NOx reduction capability of the NOx catalyst 014 is supposed to be improved.

In the meantime, the content of oxygen in exhaust gas emitted from the diesel engine 05 is generally about 18 to 20% during idling, and as small as about 3 to 5% during full-throttle operations. Since the content of oxygen is particularly small during half-throttle and full-throttle operations, in which a large amount of NOx is contained in exhaust gas, only a small amount of HC is produced for effectively reducing NOx even if the temperature of the decomposition chamber 017 is raised to as high as almost 1000° C., resulting in insufficient NOx reduction efficiency of the NOx catalyst 014. Also, the atmosphere used for thermal decomposition needs to be heated to as high as about 1000° C., which is disadvantageous in terms of increased electric power consumed by the electric heater 016.

In another exhaust gas purifying system as disclosed in Japanese laid-open Patent Publication No. 6-212952, the thermal decomposition device 015 as disclosed in the above-indicated Utility Model Publication No. 4-54926 is replaced by a fuel reforming device using a suitable catalyst.

The fuel-reforming device serves to reform diesel fuel or light oil into a lower-molecular-weight compound at about 280° C. by using a catalyst for reforming diesel fuel, and produce oxygen-containing lower hydrocarbon by supplying the air or exhaust gas to the fuel.

Although the power consumed by the electric heater can be reduced by use of the fuel reforming device, the catalyst for reforming diesel fuel is expensive, and thus the use of the catalyst results in increases in the size and cost of the system.

The present invention was developed to solve the problems encountered in the known systems as described above, namely, the system in which diesel fuel is directly injected into the exhaust passage located upstream of the NOx catalytic converter, the system as disclosed in Japanese laid-open Utility Model Publication No. 4-54926 wherein diesel fuel is injected into a high-temperature atmosphere (exhaust gas) heated to about 1000° C., and thermally decomposed to produce unsaturated lower hydrocarbon, which is then added as reducing HC into the exhaust passage upstream of the NOx catalytic converter, and the system, in which diesel fuel is reformed into a low-molecular-weight compound, using a catalyst for reforming diesel fuel, and the air or exhaust is supplied to produce oxygen-containing lower hydrocarbon, which is added as NOx reducing HC into the exhaust passage upstream of the NOx catalytic converter. It is, therefore, an object of the present invention to provide a NOx reduction system for combustion exhaust gas, which provides higher NOx reducing capability than the known systems, and simple in structure and available at a lower cost.

SUMMARY OF THE INVENTION

To accomplish the above object, the present invention provides a NOx reduction system for combustion exhaust gas, comprising: a NOX catalytic converter mounted in an exhaust passage of an engine, for reducing NOx in the exhaust gas containing excess oxygen; an air supply device comprising an air supply passage that communicates at one end thereof with a portion of the exhaust passage located upstream of the NOx catalytic converter, and is connected at the other end thereof to an air supply source; a fuel supply device disposed in the middle of the air supply passage and operable to inject fuel into the air supplied from the air supply source; a heating device that heats the fuel added to the air to 350–450° C. to partially oxidize the fuel.

BRIEF DESCRIPTION OF THE DRAWINGS

The invention will be described in greater detail with reference to a preferred embodiment thereof and the accompanying drawings, wherein.

DETAILED DESCRIPTION OF THE PREFERRED EMBODIMENT

One preferred embodiment of the present invention will be described in detail with reference to FIG. 1 and FIG. 2.

Figure 1:
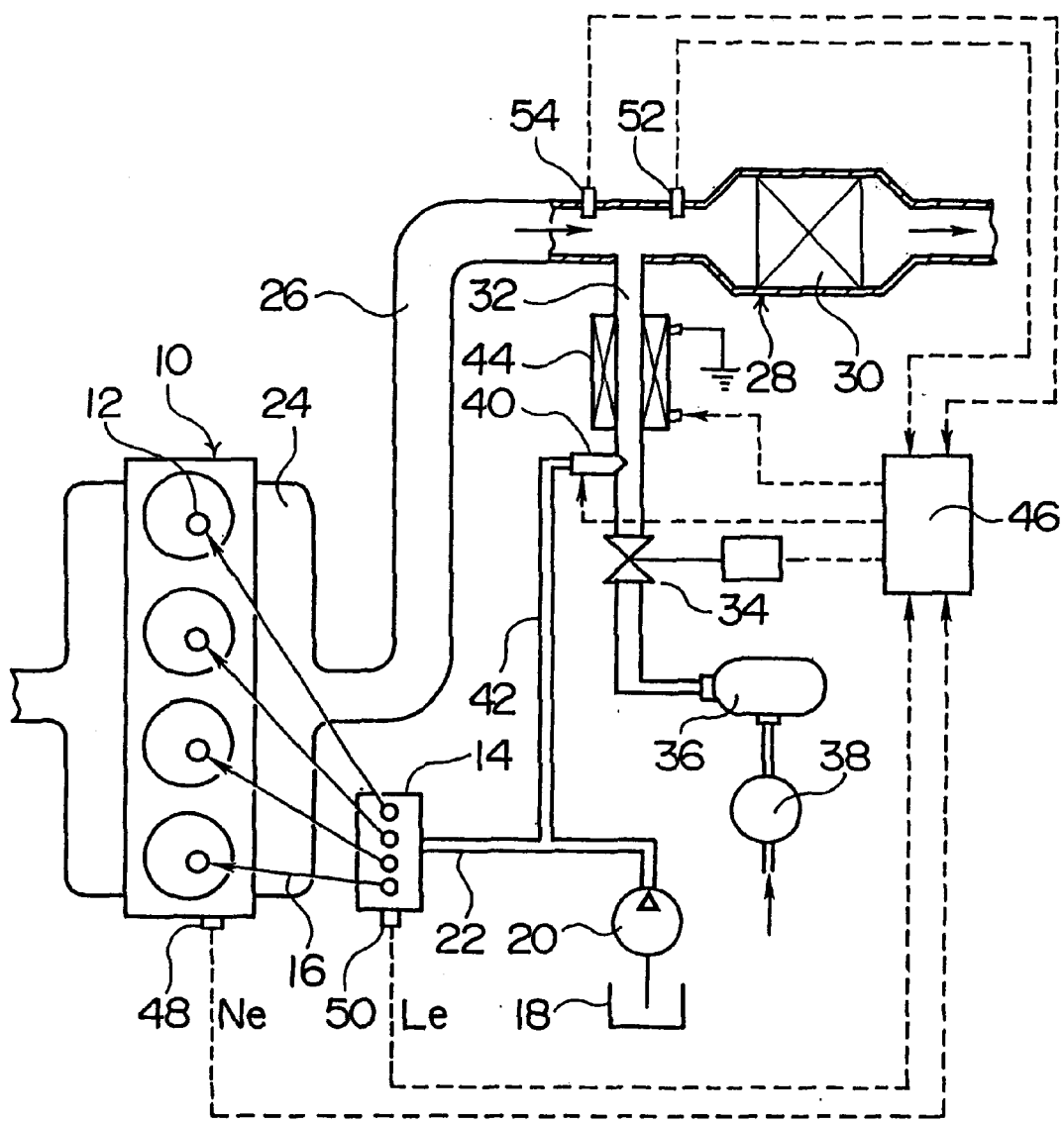
FIG. 1 is a view schematically showing the construction of a NOx reduction system according to one referred embodiment of the present invention.

In the schematic view of FIG. 1, reference numeral 10 denotes a four-cycle multicylinder diesel engine 10 (four-cylinder engine in this embodiment) for a motor vehicle such as a truck. Each cylinder of the engine 10 is provided with a fuel injector nozzle 12, to which diesel fuel or light oil is supplied from a corresponding pump unit of a fuel injection pump 14, through a corresponding fuel injection pipe 16. A feed pump 20 serves to supply diesel fuel reserved in a fuel tank 18 to the fuel injection pump 14, through a fuel supply pipe 22.

During the operation of the diesel engine 10, its exhaust gas is emitted from the engine 10 into an exhaust passage 26 that includes an exhaust manifold 24 and a Nox catalytic converter 28 disposed at a suitable location. The NOx catalytic converter 28 contains a NOx catalyst 30 that is preferably constructed such that a catalyst whose main component is a silver-containing oxide, such as $AgAlO_2$, is supported by a honeycomb structure or support made of, for example, cordierite.

An air supply passage 32 is connected at its one end to a portion of the exhaust passage 26 located upstream of the NOx catalytic converter 28, and connected at the other end to an air supply source or air tank 36 through a flow rate control valve 34. Air that has been pressurized by an air compressor or air pump 38 is supplied to the air supply source 36.

A fuel injection valve 40 that forms a diesel fuel adding device is provided at a certain position of the air supply passage 32 that is located downstream of the flow rate control valve 34. The fuel injection valve 40 is connected to the fuel supply pipe 22 through a fuel supply branch pipe 42.

A heating device 44, which is preferably in the form of an electric heater at a portion of the air supply passage 32, is located downstream of the flow rate control valve 34. In operation, the heating device 44 functions to heat the air flowing through the air supply passage 32 and diesel fuel mist injected from the fuel injection valve 40.

A control unit 46 shown in FIG. 1 is adapted to control the opening of the flow rate control valve 34, namely, the amount of the air flowing from the air supply source 36 into the air supply passage 32, the open/close state of the fuel injection valve 40, namely, the amount of diesel fuel sprayed into the air supply passage 32, and electric power supplied to the heating device 44, namely, the temperature of the air containing the fuel mist and flowing in the air supply passage 32.

The system shown in FIG. 1 further includes an engine speed sensor 48 for detecting an engine speed that represents an operating state of the diesel engine 10, a load sensor 50 that detects the load applied to the engine, a temperature sensor and others. The control unit 46 receives an output signal Ne of the engine speed sensor 48, output signal Le of the load sensor 50, and other signals such as that representing the temperature of engine coolant, and detects the amount and temperature of exhaust gas discharged into the exhaust passage 26. Based on the operating states of the engine thus detected, the control unit 46 supplies drive outputs to the flow rate control valve 34, fuel injection valve 40, and the heating device 44. Although the load sensor 50 consists of a position sensor for detecting the position of a rack used for controlling the fuel supply amount of the fuel injection pump 50 in the embodiment of FIG. 1, the load sensor 50 may be provided by a sensor for detecting the amount of depression of an accelerator pedal of the vehicle.

If necessary, first and second temperature sensors 52, 54 are provided on the downstream and upstream sides of a portion of the exhaust passage 26, at which one end of the air supply passage 32 communicates with the exhaust passage 26. The first and second temperature sensors 52, 54 send to the control unit 46 information on the temperature of a mixture of exhaust gas and the air supplied from the passage 32, which is detected immediately upstream of the NOx catalyst 30, and the temperature of the exhaust gas itself. On the basis of the above temperature information, the control unit 46 corrects drive outputs to the flow rate control valve 34 and other components.

In the system as described above, diesel fuel or light oil is supplied from the fuel injection pump 14 to each cylinder of the diesel engine 10 through the fuel injection pipe 16 and the fuel injector nozzle 12. On the other hand, exhaust gas flows into the exhaust passage 26 including the exhaust manifold 24, and passes through the NOx catalytic converter 28 disposed in the exhaust passage 26 so that NOx contained in the exhaust gas is removed by the NOx catalyst 30 contained in the catalytic converter 28. Thereafter, the exhaust gas is discharged to the atmosphere.

As known in the art, diesel engines for motor vehicles, such as trucks, operate in widely and frequently varying operating states, ranging from idling to full-throttle operation, and the temperature and flow rate of exhaust gas and excess oxygen and NOx contained in the exhaust gas vary to great extents depending upon the operating state. For example, the exhaust gas temperature is in the range of 100 to 200° C., and the content of excess oxygen is 18–20% (weight ratio) during idling, whereas the exhaust gas temperature is approximately 500° C., and the content of excess oxygen is only about 3–5% (weight ratio) during a full-power operation. There is also a general tendency that the amount of NOx contained in exhaust gas is small during idling, but considerably increased during half-throttle and full-throttle operations. It is thus important to purify exhaust gas to reduce or remove NOx particularly during the half-throttle or full-throttle operations, in which the amount of excess oxygen in the exhaust gas is much smaller than that of the air.

The control unit 46 determines the current operating state of the diesel engine 10, based on the output signal Ne of the engine speed sensor 48, output signal Le of the load sensor 50, and other signals such as that indicating the temperature of engine coolant, as needed. Upon receipt of these signals, the control unit 46 calculates the temperature and flow rate of the exhaust gas, using a map or maps stored in the unit 46, and sends drive outputs to the flow rate control valve 34, fuel injector valve 40 and the heating device 44.

In the meantime, the NOx catalyst 30 includes a silver containing oxide, e.g., $AgAlO_2$, as a main catalytic component, which is deposited on or supported by a honeycomb structure formed of, for example, cordierite. Also, the air is supplied from the air supply passage 32 to the exhaust passage 26 on the upstream side of the NOx catalyst 30 while the flow rate control valve 34 disposed in the air supply passage 32 controls the amount of the air to be supplied.

A certain amount of diesel fuel or light oil, which is determined depending upon the flow rate of the air, is injected from the fuel injection valve 40 into the air supply passage 32 on the downstream side of the flow rate control valve 34, while diesel fuel reserved in the fuel tank 18 is supplied to the fuel injection valve 40 through the fuel supply branch pipe 42. The mixture of the air and diesel fuel in the form of mist is heated by the heating device 44 up to about 350° C. to 400° C., so that the diesel fuel in the supplied air containing a large amount of oxygen is partially oxidized to provide cracked gas containing a large amount of aldehydes such as acetaldehyde or formaldehyde, propylene, ethylene, or the like, which has a high NOx reducing capability.

For example, the flow rate of the air in the air supply passage 32 is controlled by the flow rate control valve 34 to be 20% (volume ratio) of the flow rate of the exhaust gas, and the diesel fuel injected from the fuel injection valve 40 into the air supply passage 32 is controlled to be 3–6% (weight ratio) of that of diesel fuel supplied to the engine 10. Also, the mixture of the air and the diesel fuel mist is heated to 350° C. by the heating device 44. The diesel fuel mist is partially oxidized into cracked gas, which is added, along with supplied air, to the exhaust gas, so that NOx contained in the exhaust gas is efficiently reduced upon contact with the NOx catalyst 30, and the exhaust gas is thus purified.

Figure 2:
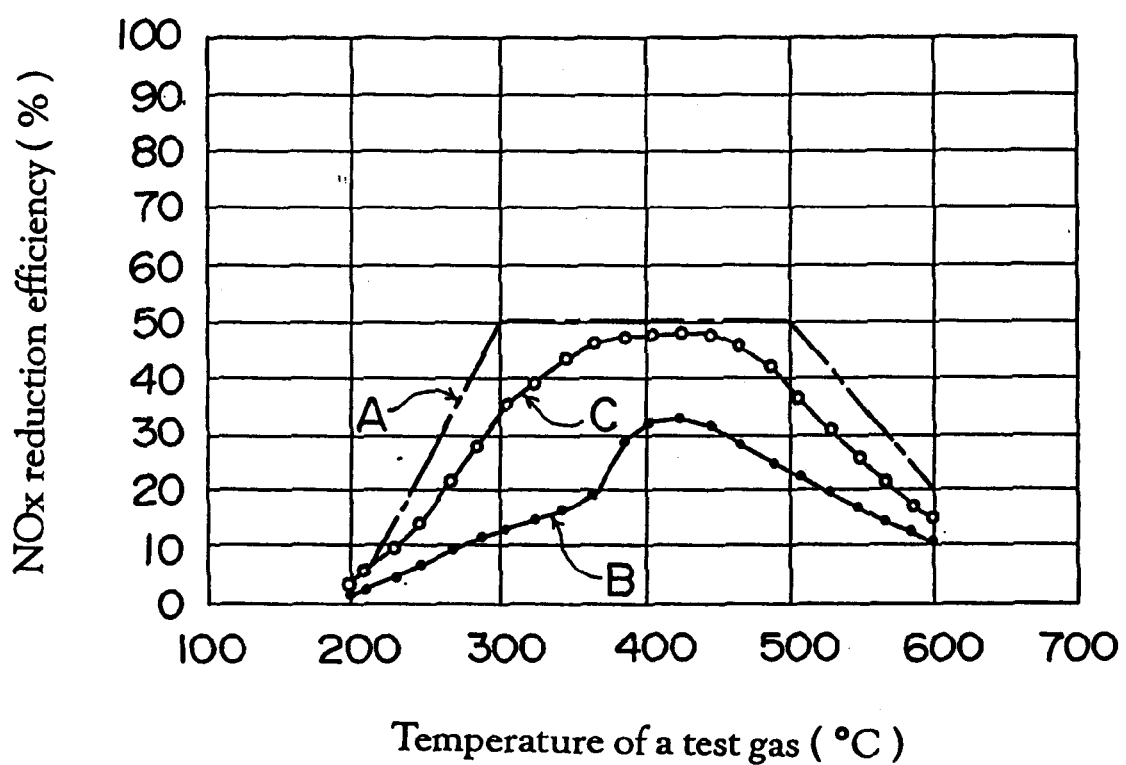
FIG. 2 is a graph showing the NOx reduction efficiency of the NOx reduction system according to the present invention as compared with that of a known exhaust purifying system.
Figure 3:
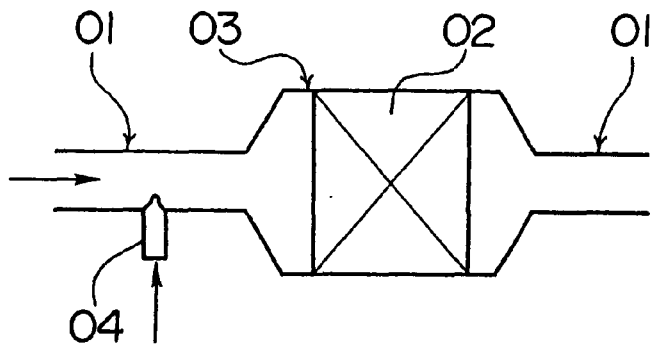
FIG. 3 is a view schematically showing the construction of a known exhaust purifying system in which diesel fuel is directly injected into an exhaust passage at the upstream side of a NOx catalytic converter.
Figure 4:
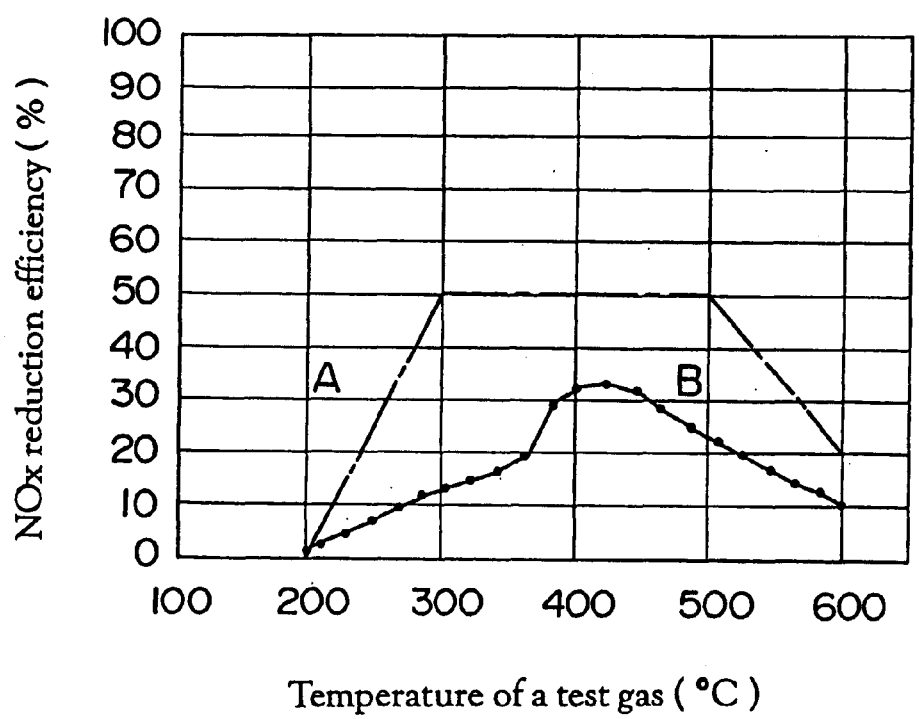
FIG. 4 is a graph showing the NOx reduction efficiency of the known exhaust purifying system as shown in FIG. 3.
Figure 5:
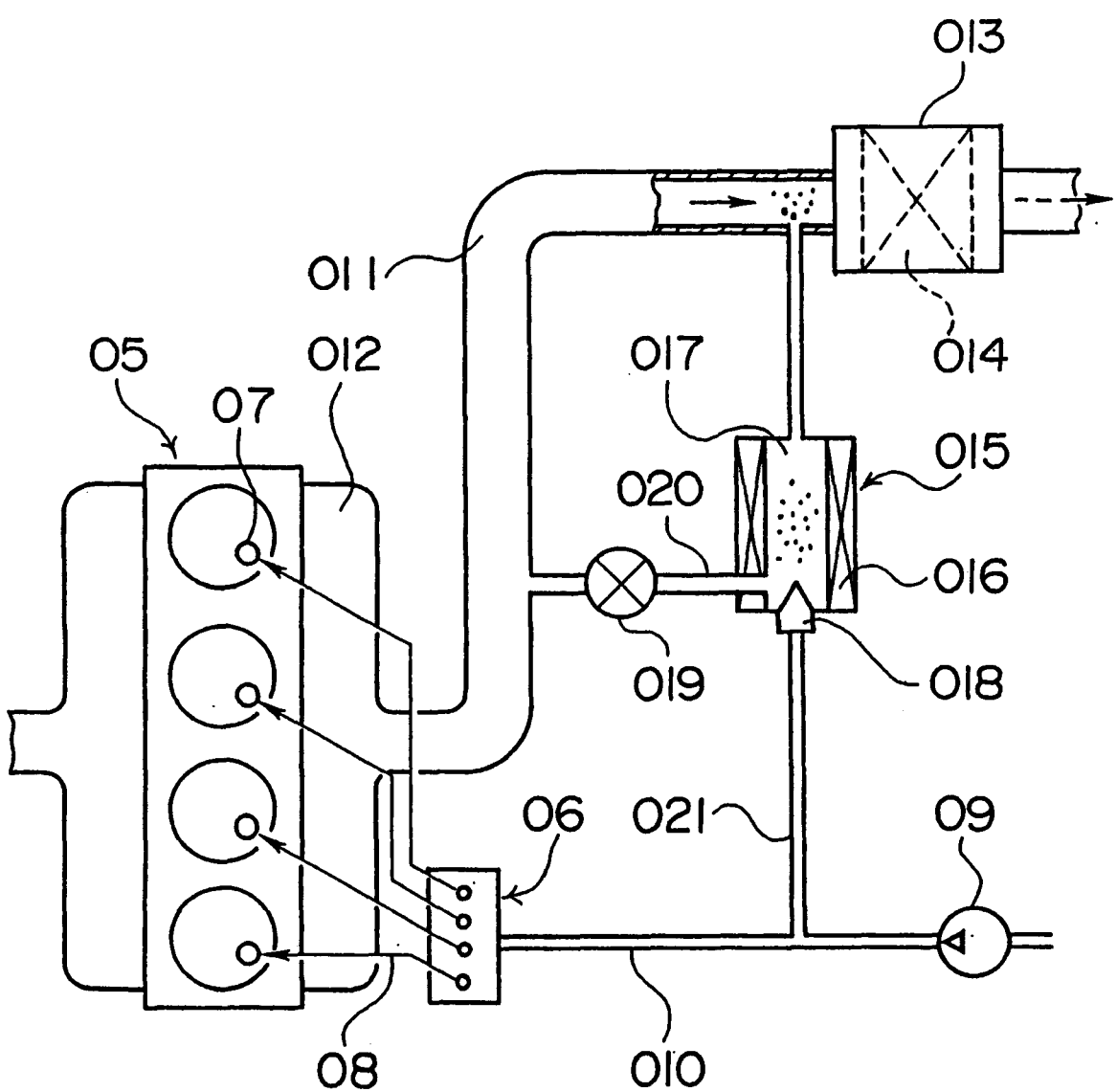
FIG. 5 is a view schematically showing the construction of a NOx reduction system as disclosed in Japanese laid-open Utility Model Publication No. 4-54926.

In the graph of FIG. 2, the horizontal axis indicates the temperature (° C.) of a test gas that simulates exhaust gas of an actual diesel engine, and the vertical axis indicates the NOx reduction efficiency (%). In FIG. 2, curve C shows the result of measurement of the NOx reduction efficiency when a mixture of the air and cracked gas obtained by partially oxidizing diesel fuel, which was heated to 350° C., was added to the exhaust gas at the upstream side of the NOx catalyst 30. As in the graph of FIG. 4 showing the NOx reduction efficiency of the known system, the flow rate of the test gas was $SV=4000\ h^{-1}$, and the concentration of the diesel fuel added was 3000 PPM. For comparison, ideal or target performance curve A and curve B representing the NOx reduction efficiency of the known device in which the diesel fuel is directly added to the exhaust gas with the same concentration are shown in the graph of FIG. 4.

As is apparent from FIG. 2, curve C of the NOx reduction efficiency obtained from the above-described embodiment shows a far better NOx reduction characteristic than curve B obtained from the known system, in which diesel fuel is directly injected into exhaust gas. Furthermore, the present embodiment provides an excellent NOx reduction characteristic as indicated by curve C, which is closer to that of the target performance curve A, over the entire range from half-throttle operations to full-throttle operations of the engine. In particular, sufficiently high NOx reduction efficiency can be achieved when the test gas temperature is in the range of 380–450° C. Thus, when the results of measurements of the first and second temperature sensors 52, 54 indicate that the exhaust gas temperature immediately upstream of the NOx catalyst 30 is higher than 450° C., the opening of the flow rate control valve 34 is increased to increase the amount of air supply, thereby to reduce the temperature of the exhaust gas immediately upstream of the NOx catalyst 30 down to the temperature range of 380 to 450° C.

As described above, the NOx reduction system for combustion exhaust gas according to the present invention includes: a NOx catalytic converter mounted in an exhaust passage of an engine and operable to reduce NOx in the exhaust gas containing excess oxygen; an air supply passage that communicates at one end thereof with a portion of the exhaust passage located upstream of the NOx catalytic converter, and is connected at the other end to an air supply source; a fuel supply device disposed in the middle of the air supply passage and operable to inject fuel into the air supplied from the air supply source; a heating device that heats the fuel added to the air to 350–450° C. so as to partially oxidize the fuel.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A NOx reduction system for combustion exhaust gas, comprising:

a NOx catalytic converter mounted in an exhaust passage of an engine and operable to reduce NOx in the exhaust gas containing excess oxygen;

an air supply device comprising an air supply passage that communicates at one end thereof with a portion of the exhaust passage located upstream of said NOx catalytic converter, and is connected at the other end thereof to an air supply source;

a fuel supply device disposed in the air supply passage and operable to inject fuel into the air supplied from the air supply source;

a heating device that heats the fuel added to the air to about 350–450° C. to partially oxidize the fuel; and a control device for maintaining the temperature of the fuel heated in said heating device within the temperature range of about 350–450° C.

2. A NOx reduction system according to claim 1, further comprising:

an engine state detecting device that detects an operating state of the engine;

wherein said air supply device controls a flow rate of the air according to the operating state detected by said engine state detecting device.

3. A NOx reduction system according to claim 2, wherein said engine state detecting device detects a flow rate of the exhaust gas flowing through the exhaust passage, and wherein said air supply device controls the flow rate of the air depending upon the flow rate of the exhaust gas detected by the engine state detecting device.

4. A NOx reduction system according to claim 3, wherein said air supply device controls the flow rate of the air to be about 20% of the flow rate of the exhaust gas detected by the engine state detecting device.

5. A NOx reduction system according to claim 1, further comprising:

an engine state detecting device that detects an operating state of the engine, wherein said fuel supply device controls an amount of the fuel added to the air according to the operating state of the engine detected by said engine state detecting device.

6. A NOx reduction system according to claim 5, wherein said engine state detecting device detects the amount of the fuel supplied to the engine for rotation thereof, and wherein said fuel supply device controls the amount of the fuel added to the air depending upon the amount of the fuel detected by the engine state detecting device.

7. A NOx reduction system according to claim 6, wherein said fuel supply device controls the amount of the fuel added to the air to be about 3 to 6% of the amount of the fuel detected by the engine state detecting device.

8. A $NO_x$ reduction system according to claim 2, wherein said engine state detecting device detects the operating state of the engine based at least on an engine speed and an engine load.

9. A $NO_x$ reduction system according to claim 3, wherein said air supply device determines the flow rate of air from a map based on the detected flow rate of the exhaust gas.

10. A $NO_x$ reduction system according to claim 5, wherein said engine state detecting device detects the operating state of the engine based at least on an engine speed and an engine load.

11. A $NO_x$ reduction system according to claim 6, wherein said fuel supply device determines the amount of fuel to be added to the air from a map based on the detected amount of fuel supplied to the engine.

12. The NOx reduction system of claim 1, wherein said control device includes a temperature sensor for sensing the temperature of the fuel heated by the heating device, and a control valve in the air supply passage for controlling the supply of air to the heating device responsive to the temperature sensed by said temperature sensor.

13. A NOx reduction system for combustion exhaust gas, comprising:

a NOx catalytic converter mounted in an exhaust passage of an engine and operable to reduce NOx in the exhaust gas containing excess oxygen;

an air supply device comprising an air supply passage that communicates at one end thereof with a portion of the exhaust passage located upstream of said NOx catalytic converter, and is connected at the other end thereof to an air supply source;

a fuel supply device disposed in the air supply passage and operable to inject fuel into the air supplied from the air supply source;

a heating device that heats the fuel added to the air to about 350–450° to partially oxidize the fuel; and an engine state detecting device that detects an operating state of the engine;

wherein said air supply device controls a flow rate of the air according to the operating state detected by said engine state detecting device;

wherein said engine state detecting device detects a flow rate of the exhaust gas flowing through the exhaust passage, and wherein said air supply device controls the flow rate of the air depending upon the flow rate of the exhaust gas detected by the engine state detecting device.

14. A NOx reduction system according to claim 13, wherein said air supply device controls the flow rate of the air to be about 20% of the flow rate of the exhaust gas detected by the engine state detecting device.

15. A NOx reduction system according to claim 13, wherein said air supply device determines the flow rate of air from a map based on the detected flow rate of the exhaust gas.

* * * * *